No. 810,768.  
PATENTED JAN. 23, 1906.
C. K. JOHNSON.  
FERTILIZER DISTRIBUTER.  
APPLICATION FILED AUG. 1, 1905.
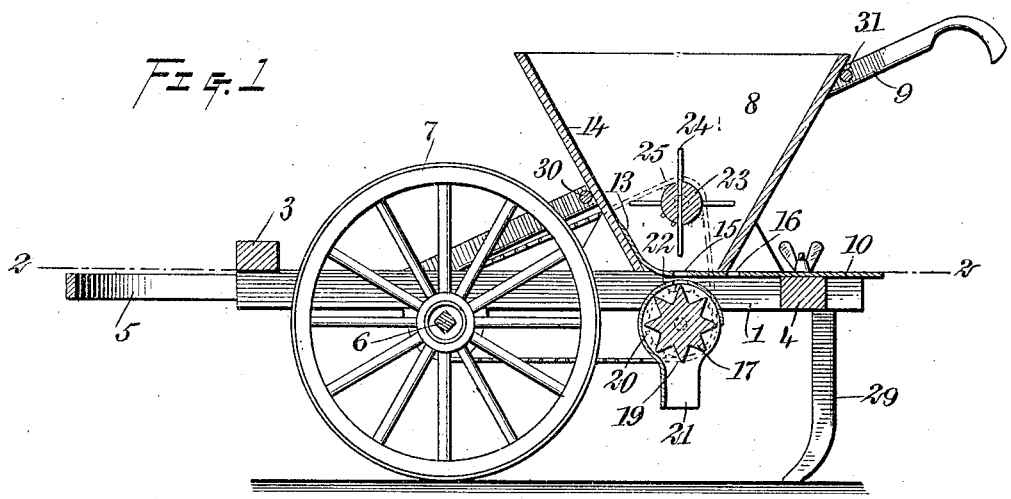
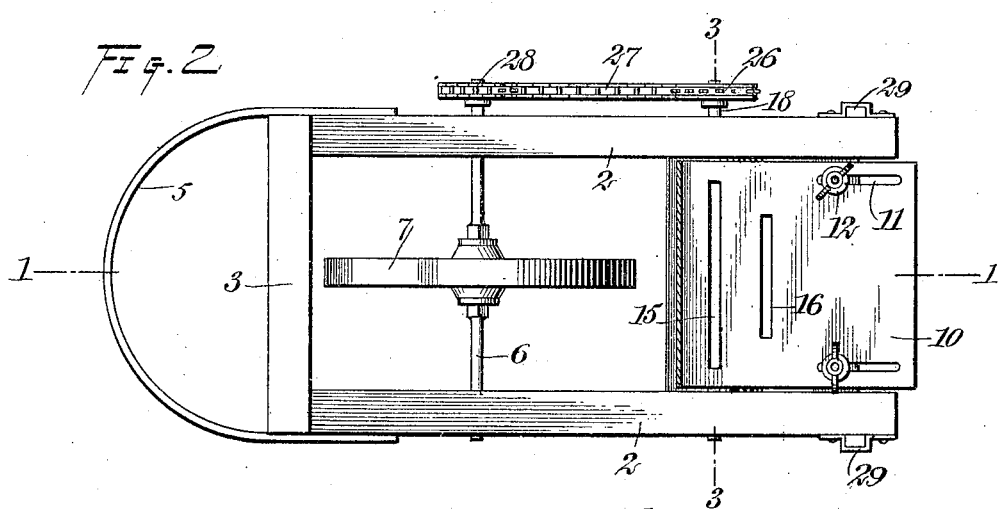
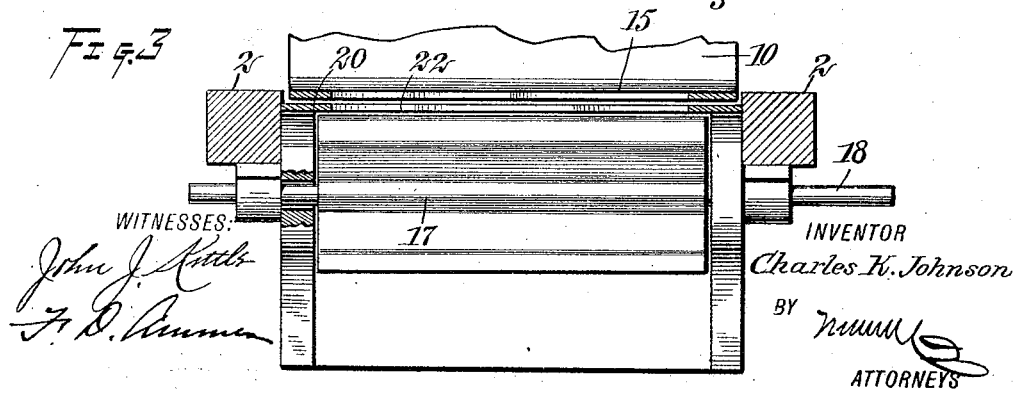
WITNESSES:
INVENTOR  
Charles K. Johnson  
BY  
ATTORNEYS

UNITED STATES PATENT OFFICE.

CHARLES K. JOHNSON, OF FLORENCE, SOUTH CAROLINA.

FERTILIZER-DISTRIBUTER.

No. 810,768.  Specification of Letters Patent.  Patented Jan. 23, 1906.

Application filed August 1, 1905. Serial No. 272,145.

*To all whom it may concern:*

Be it known that I, CHARLES K. JOHNSON, a citizen of the United States, and a resident of Florence, in the county of Florence and State of South Carolina, have invented a new and Improved Fertilizer-Distributer, of which the following is a full, clear, and exact description.

This invention relates to fertilizer-distributers, and is intended especially to be used by cotton-planters in fertilizing fields with guano. The distributer is adapted to be advanced along the furrows in which the cotton is to be planted.

The object of the invention is to provide an improved means for controlling the feeding of the fertilizer from the distributer.

The invention consists in the construction and combination of parts to be more fully described hereinafter and definitely set forth in the claim.

Reference is to be had to the accompanying drawings, forming a part of this specification, in which similar characters of reference indicate corresponding parts in all the figures.

Figure 1 is a vertical central section through the machine, taken on the line 1 1 of Fig. 2. Fig. 2 is a plan of the lower portion of the frame of the machine and illustrating the construction and manner of mounting a feed-plate which is disposed beneath the hopper. This view is substantially a section on the line 2 2 of Fig. 1, and Fig. 3 is a cross-section taken on the line 3 3 of Fig. 2.

Referring more particularly to the parts, 1 represents the frame of the machine, which is of substantially rectangular form, comprising side beams 2 and a transverse cross-beam 3 at the front. Near their rear extremities the beams 2 are connected by a transverse tail-beam 4, the upper face whereof is somewhat depressed below the upper faces of the side beams, as indicated. At the forward portion of the frame a yoke 5 is rigidly attached, which facilitates the attachment of draft-animals to the implement, if desired.

Near the forward portion of the frame 1 and on the under side thereof I mount an axle 6, carrying rigidly a wheel 7, disposed centrally in the frame, as indicated. This wheel 7 is adapted to run in the furrow and affords means for driving an automatic feed. Just at the rear of the wheel above the frame 1 there is mounted a hopper 8 of any suitable construction, such as that shown. At the sides of this hopper handles 9 are provided, which incline upwardly and rearwardly, the forward extremities of the said handles being attached to the side beams 2 in the vicinity of the axle, as indicated in Fig. 1. This hopper 8 is closed below by means of a feed-plate 10, which rests upon the upper face of the tail-beam 4. Adjacent to the tail-beam the feed-plate is provided with oppositely-disposed longitudinal slots 11, through which clamping-bolts 12 pass upwardly, enabling the feed-plate to be rigidly secured to the frame in any position desired. The forward portion of the feed-plate passes under the hopper, and its forward edge 13 is bent upwardly, as shown in Fig. 1, lying against the inclined forward wall 14 of the hopper. The forward portion of the feed-plate 10 is provided with transverse slots 15 and 16 of different lengths, and these slots constitute openings through which guano within the hopper may pass. It should be understood in this connection that the feed-plate can be secured in position so that either of the openings 15 or 16 is presented in the bottom of the hopper. As illustrated in Fig. 1, the opening 15, which is the longest, is arranged so as to constitute a feed-opening. If desired, however, the bolts 12 may be loosened and the feed-plate advanced forwardly, so as to bring the opening 16 into the position formerly occupied by the opening 15, which is substantially under the central line of the hopper.

Just below the hopper I provide a feed-roller 17, which is mounted to rotate with a horizontal shaft 18, the said roller having longitudinal ribs or convolutions 19. This roller is substantially surrounded by a casing 20, and the wall thereof is cylindrical, as shown, so as to conform to the outline of the roller. The lower portion of the casing is formed into a rudimentary chute 21, at which the fertilizer is ejected. The upper portion of the cylindrical wall of the casing 20 is provided with a transverse slot or opening 22, and when the openings 15 or 16 are adjusted into position they may register with this opening 22. When so registered, the fertilizer may pass downwardly from the hopper into the casing of the feed-roller, from which it is fed automatically by the advance of the implement.

In the lower portion of the hopper 8 I mount a horizontal shaft 23, which has an enlarged cylindrical body, as indicated in Fig. 1. Through this body bars 24 are secured, the extremities whereof project, as indicated, so as to constitute arms lying in the space within the hopper. This shaft 23 may have a reduced extremity on which there is rigidly attached a sprocket-wheel 25. A similar sprocket-wheel 26 is rigidly carried by the shaft 18 of the feed-roller. Around these sprocket-wheels and sprocket 28 a sprocket-chain 27 passes, and this chain is adapted to be driven by the rotation of the wheel 7. For this purpose the axle 6 extends beyond the frame and carries rigidly a sprocket-wheel 28, over which the chain 27 passes. From this arrangement when the machine is advanced along a row or furrow the movement of the driving-chain 27 rotates the shaft 23 and the feed-roller 17 in a forward direction. The rotation of the shaft 23 with its projecting arms constitutes an agitator for stirring up the fertilizer in the lower portion of the hopper, facilitating its gravitation through the feed-opening 22 in the casing 20. In this way the fertilizer is made to pass down into the gutters or grooves between the ribs 19 on the roller 17, and as the roller turns the fertilizer is discharged outside or near the lower side thereof. The fact that the slots or openings 15 and 16 are of different widths enables the quantity of fertilizer to be varied, and of course the width of the fertilized belt or row is changed accordingly.

Near the rear portion of the frame 1 a pair of legs 29 are provided, which project downwardly and are adapted to support the rear portion of the frame.

Referring especially to Fig. 3, attention is called to the fact that the width of the feed-plate 10 is sufficient to bridge the space between the inner faces of the side beams 2, so that the side beams virtually constitute a guide for the same in adjusting the slots into position. In this connection it should also be observed that the upper side of the casing 20 is slightly depressed below the upper faces of the side beams, so that this guiding effect is produced at the forward portion of the feed-plate as well as at the rear.

In order to increase the rigidity of the hopper, upon the handles 9 I provide transverse braces 30 and 31, which connect the handles and rest, respectively, against the forward and rear walls of the hopper, as indicated in Fig. 1.

The plate 10 is preferably formed of pliable sheet metal, such as galvanized iron or mild steel, these materials adapting the plate admirably for the upward bending to which the forward portion thereof is subjected.

Having thus described my invention, I claim as new and desire to secure by Letters Patent—

A fertilizer-distributer having a frame and a hopper supported thereupon, a feed-plate having openings of different lengths transversely disposed with respect to the direction of advance of the implement, the said plate affording means for closing the lower portion of said hopper, the forward portion of said feed-plate being bent upwardly and lying against the inner face of the wall of said hopper, a feed-roller disposed beneath said feed-opening, means for driving said feed-roller with the advance of said frame, and means for adjusting said feed-plate.

In testimony whereof I have signed my name to this specification in the presence of two subscribing witnesses.

CHARLES K. JOHNSON.

Witnesses:
  J. W. McCaron,
  E. H. Bacot.